US008660555B2

(12) United States Patent
Pichna et al.

(10) Patent No.: US 8,660,555 B2
(45) Date of Patent: Feb. 25, 2014

(54) QUALITY OF SERVICE MECHANISM

(75) Inventors: Roman Pichna, Espoo (FI); Zexian Li, Espoo (FI)

(73) Assignee: Core Wireless Licensing S.A.R.L., Luxembourg (LU)

( * ) Notice: Subject to any disclaimer, the term of this patent is extended or adjusted under 35 U.S.C. 154(b) by 350 days.

(21) Appl. No.: 11/592,259

(22) Filed: Nov. 3, 2006

(65) Prior Publication Data

US 2008/0107084 A1    May 8, 2008

(51) Int. Cl.
*H04W 4/00* (2009.01)

(52) U.S. Cl.
USPC ........... 455/433; 455/436; 370/328; 370/331; 370/342; 370/441

(58) Field of Classification Search
USPC .................. 370/328, 342, 441, 331; 455/436
See application file for complete search history.

(56) References Cited

U.S. PATENT DOCUMENTS

| | | | |
|---|---|---|---|
| 6,606,311 B1 | 8/2003 | Wang et al. | |
| 6,904,015 B1 * | 6/2005 | Chen et al. | 370/235 |
| 6,904,027 B1 * | 6/2005 | Mukherjee | 370/331 |
| 2002/0080757 A1 * | 6/2002 | Narvanen et al. | 370/338 |
| 2003/0185202 A1 * | 10/2003 | Maenpaa | 370/352 |
| 2004/0042423 A1 * | 3/2004 | Borella et al. | 370/328 |
| 2006/0031924 A1 * | 2/2006 | Kwon et al. | 726/2 |
| 2006/0198349 A1 * | 9/2006 | Ng et al. | 370/338 |
| 2006/0246900 A1 | 11/2006 | Zheng | |
| 2006/0291419 A1 * | 12/2006 | McConnell et al. | 370/331 |
| 2007/0160072 A1 * | 7/2007 | Thalanany et al. | 370/401 |

FOREIGN PATENT DOCUMENTS

WO    WO 2007/019810 A1    2/2007

OTHER PUBLICATIONS

Bing Xu, "Access Service Network—A Key Network Element in WiMAX System", Global WiMAX Summit in Chine 2006, pp. 1-22.
Angori, Enrico et al., "Extending WiMAX Technology to Support End to End QoS Guarantees", WiMAX Forum, Dec. 2005, pp. 1-12.
WiMAX Forum, "Mobile WiMAX-Part 1: A Technical Overview and Performance Evaluation", Feb. 21, 2006, pp. 1-53.
International Search Report PCT/FI2007/050583 filed Oct. 31, 2007.
WiMax Forum, "WiMax End-to-End Network Systems Architecture", (Stage 2: Architecture Tenets, Reference Model and Reference Points), Dec. 15, 2005, XP002442962.
Search Report dated Nov. 12, 2012 for corresponding European Patent Application No. 07 82 3220.
Office Action dated Jan. 8, 2013 for corresponding European Patent Application No. 07 82 3220.
3GPP TSG SA WG2 Architecture—S2#54, S2-063038, "PCC Funtions for Support of WiMAX NWG Systems", PCC/REL-7, pp. 4-6, Aug. 28-Sep. 1, 2006.
Chinese Office Action, dated Jul. 24, 2012; Issued on corresponding Application No. 200780048914.3.

\* cited by examiner

*Primary Examiner* — Nimesh Patel
(74) *Attorney, Agent, or Firm* — Winstead PC

(57)     ABSTRACT

A system comprises a subscriber station and a network, the network comprising an access service network and connectivity service network. In an improved communication method an access service network a quality of service profile for a subscriber is received by an anchor gateway of the subscriber. On the basis of the quality of service profile, a first set of transmission control parameters for the subscriber is determined. The anchor gateway applies the first set of transmission control parameters to user data packets addressed to the subscriber.

20 Claims, 3 Drawing Sheets

QUALITY OF SERVICE MECHANISM

FIELD OF THE INVENTION

The present invention relates to communications and more particularly to a communication system that comprises different networks providing varying transmission capacities.

BACKGROUND OF THE INVENTION

In the fields of packet-switched networks and computer networking, a traffic engineering term Quality of Service (QoS) refers to the probability of the telecommunication network to meet a given traffic contract. In many cases is used informally to refer to the probability of a packet succeeding in passing between two points in the network within its desired latency period. Basically QoS works by slowing unimportant packets down, or in the cases of extreme network traffic, throwing them away entirely. This leaves room for important packets to reach their destination as quickly as possible.

The numerous communication technologies provide a wide rage of mechanisms to maintain appropriate quality of service. A primitive approach to quality of service problem is generous over-provisioning of capacity so that interior links are considerably faster than access links. In larger scale systems and complex communication environments it is, however, not possible to rely only on such extravagant approach. One method of balancing the capacities is to apply subscriber-based quality of service. Network customers and providers may enter into a contractual agreement (a Service Level Agreement), which specifies in detail the ability of a network/protocol to give guaranteed performance/throughput/latency bounds based on mutually agreed measures. These specifications are mapped into subscriber specific quality of service profiles that are distributed and applied in implementing the communication access.

Advanced communication systems define subscriber-based quality of service system functionalities that are highly sophisticated and enable adjustment of the transmission parameters with local policies in several network domains. As a downside, the resulting complexity of these mechanisms is high and latencies related to signaling are high. Optimized solutions for quick and straightforward subscriber-based quality of service are needed.

SUMMARY

An object of the present invention is thus to provide an improved communication solution. The objects of the invention are achieved by a method, an apparatus, a system, a computer program product and a computer program distribution medium, which are characterized by what is stated in the independent claims. The preferred embodiments of the invention are disclosed in the dependent claims.

According to an aspect of the invention, there is provided a method, comprising receiving in an anchor gateway of an access service network a quality of service profile for a subscriber, determining, on the basis of the quality of service profile, a first set of transmission control parameters for the subscriber, and applying in the anchor gateway the first set of transmission control parameters to user data packets addressed to the subscriber.

According to an aspect of the invention, there is also provided an apparatus comprising a basic functionality unit configured to implement functionality of an anchor gateway of an access service network, a receiver unit configured to receive user data packets addressed to subscribers anchored to the access service network, wherein the receiver unit is configured to receive a quality of service profile for a subscriber, a processing unit configured to determine, on the basis of the received quality of service profile, a first set of transmission control parameters for the subscriber; and apply the first set of transmission control parameters to user data packets addressed to the subscriber.

According to an aspect of the invention, there is also provided an apparatus comprising a basic functionality unit configured to implement functionality of a base station of an access service network, a receiver unit configured to receive user data packets from a subscriber station, a processing unit configured to check a user data packet from the subscriber station for at least one predetermined classification characteristic of the user data packet; and mark the user data packet on the basis of the existence of the at least one characteristic, each marking corresponding to a set of transmission control parameters.

According to an aspect of the invention, there is also provided a system comprising a subscriber station and a network, the network comprising an access service network and connectivity service network, the access service network including an apparatus comprising: a basic functionality unit configured to implement functionality of an anchor gateway of an access service network; a receiver unit configured to receive user data packets addressed to subscribers anchored to the access service network, wherein the receiver unit is configured to receive a quality of service profile for a subscriber; a processing unit configured to determine, on the basis of the received quality of service profile, a first set of transmission control parameters for the subscriber; and apply the first set of transmission control parameters to user data packets addressed to the subscriber.

According to an aspect of the invention, there is also provided a computer program product encoding a computer process of instructions for executing a computer process for receiving in an anchor gateway of an access service network a quality of service profile for a subscriber; determining, on the basis of the quality of service profile, a first set of transmission control parameters for the subscriber; applying in the anchor gateway the first set of transmission control parameters to user data packets addressed to the subscriber.

According to an aspect of the invention, there is also provided a computer program distribution medium readable by a computer and encoding a computer program of instructions for executing a computer process for communication, the process including: receiving in an anchor gateway of an access service network a quality of service profile for a subscriber; determining, on the basis of the quality of service profile, a first set of transmission control parameters for the subscriber; applying in the anchor gateway the first set of transmission control parameters to user data packets addressed to the subscriber.

BRIEF DESCRIPTION OF THE DRAWINGS

In the following the invention will be described in greater detail by means of preferred embodiments with reference to the attached [accompanying] drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may be combined to provide further embodiments.

The invention is applicable to communication systems that comprise a network infrastructure and a plurality of user stations. The network infrastructure comprises at least one or more core networks that provide network services, and one or more access networks through which users stations access these core network services. Core network typically represents an ample transmission facility that interconnects lower-speed distribution networks. Access networks provide a final transmission lap to the user stations and are often limited in transmission capacity. The various combinations of core and access networks create situations where transmitted traffic tends to exceed the access speed of the target interface and congest the data flow. Transmission control is used to eliminate bottlenecks in topologies with data-rate mismatches by providing control functions that optimize computer network traffic performance, latency and/or bandwidth. Transmission control is typically implemented with mechanisms that control the volume of traffic being sent into a network (bandwidth throttling), and/or the rate at which the traffic is being sent (rate limiting).

In the following, a communication system according to the invention is embodied using WiMAX network architecture. WiMAX is a standards-based technology designed to enable delivery of last mile wireless broadband access as an alternative to wired broadband like cable and DSL. Basically the term WiMAX stands for standard, interoperable implementations of IEEE 802.16 wireless networks. WiMAX technology is being designed to fixed, nomadic, portable and mobile wireless broadband connectivity in a typical cell radius deployment of three to ten kilometers. It is predicted that in near future WiMAX technology will be incorporated in various mobile communication equipment to allow at least urban areas and cities to become zones for portable outdoor broadband wireless access. It should be noted that even if the specific network configuration with mobile access is used to describe the invention, the scope must not be interpreted restrictively in view of the specific terms of the WiMAX technology or of WiMAX mobile access as such.

Figure 1:
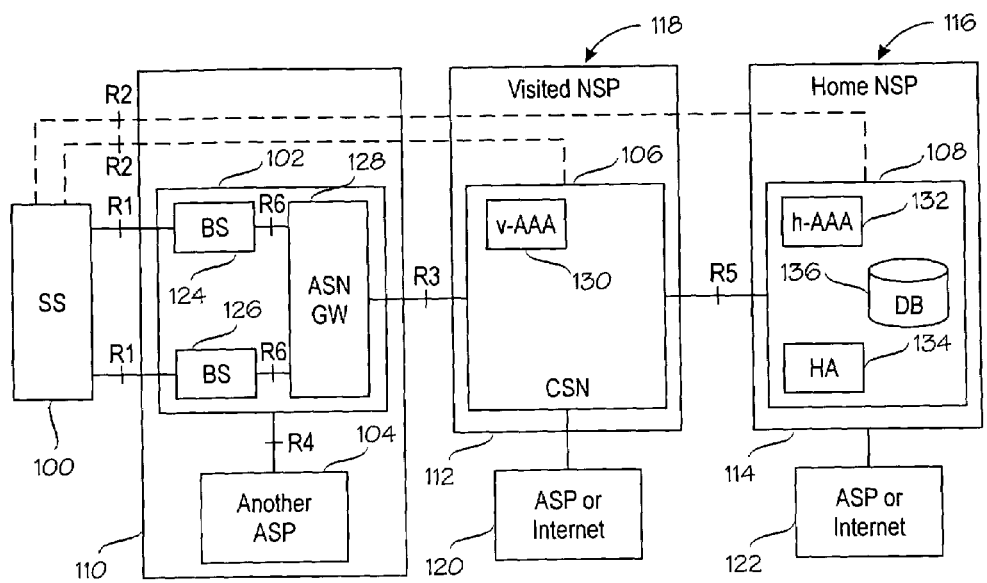
FIG. 1 illustrates a network reference model of the embodied communication system.

FIG. 1 illustrates a simplified network reference model of WiMAX communication system, as specified by the WiMAX Forum. The configuration shown in FIG. 1 is a logical representation of the WiMAX network architecture and identifies functional entities and reference points over which interoperability is achieved. Each of the shown entities represents a grouping of functional entities. On the other hand, each of the functions may be realized in a single physical entity or be distributed over multiple physical entities.

A subscriber station 100 is a device that functions within a network infrastructure together with the software, applications, and content directly related to the device, and thereby provides to its user connectivity to the network infrastructure. The network infrastructure comprises access service networks (ASN) 102, 104 and connectivity service networks (CSN) 106, 108. Access service network may be defined herein as a complete set of network functions needed to provide radio access to a WiMAX subscriber. Connectivity service network may correspondingly be defined as a set of network functions that provide IP connectivity services to one or more WiMAX subscribers.

A network access provider (NAP) 110 illustrates a business entity that provides WiMAX radio access infrastructure to one or more WiMAX network service providers (NSP) 112, 114. NAP implements this infrastructure using one or more ASNs. Network service provider may be considered as a business entity that provides IP connectivity and WiMAX services to WiMAX subscribers. The characteristics of the connectivity and services are defined in a Service Level Agreement NSP establishes with WiMAX subscribers. From a WiMAX subscriber standpoint, an NSP may be classified as Home NSP (H-NSP) 116 or Visited NSP (V-NSP) 118. Application service providers (ASP) 120, 122 denote here business entities that provide applications or services via V-NSP or H-NSP.

ASN comprises at least one instance of a base station (BS) 124, 126 and at least one instance of an ASN gateway (ASN-GW) 128. WiMAX base station is a logical entity that implements a full instance of WiMAX media access controller (MAC) and physical layer in compliance with the IEEE 802.16 suite of standards. A BS instance represents one sector with one frequency assignment, and incorporates scheduler functions for uplink and downlink resources. In 802.16 standards media access controller (MAC) uses a scheduling algorithm, where the subscriber station competes once for initial entry into the network. After this the subscriber station is allocated a time slot by the base station. The time slot can enlarge and contract, but it remains assigned to the subscriber station. The WiMAX scheduling algorithm thus provides a possibility to control quality of service parameters of separate subscriber stations.

ASN-GW represents an aggregation of control plane functional entities that are either paired with corresponding function in ASN (for example, BS instance), a resident function in the CSN or a function in another ASN. For every MS, a BS is associated with exactly one ASN-GW. In FIG. 1, the ASN functions hosted in ASN-GW are shown as divided into two group of functions, the decision point (DP) that includes non-bearer-plane functions of the ASN-GW, and the enforcement point (EP) that includes the bearer-plane functions of the ASN-GW.

FIG. 1 shows also reference points R1 to R6. A reference point is a conceptual point between two groups of functions that reside in different functional elements on either side of the reference point. In case the functional entities surrounding the reference point exist in different physical entities, the reference point becomes a physical interface. Reference points R1 to R6 comprise the protocols and procedures specified for the communication between the respective surrounding functional units.

From basic IP connectivity perspective, towards CSN this WiMAX Forum architecture is by far analogous to public Wireless Local Access Network (PWLAN) with mobile IP mobility In FIG. 1, v-AAA denotes functions 130 in the visited NSP and h-AAA functions 132 in the home NSP for authentication, authorization, and accounting associated with a user, his/her subscriber station and subscribed services across different access technologies. According to mobile IP, a home agent (HA) 134 of CSN represents an entity of the home network of the subscriber that encapsulates incoming datagrams destined to the subscriber station and sends them to the care-of address of the subscriber station. In WiMAX ASN-GW acts as the foreign agent that assists the mobile node in receiving datagrams delivered to the care-of address.

It should be noted that only elements relevant for disclosing the invention are shown in FIG. 1. For a person skilled in the art it is clear that communication system implementations within the scope of protection typically comprise elements not necessarily disclosed herein.

The embodiment requires also a subscriber database DB 136 accessible to the h-AAA 132 of the home NSP 116. FIG. 1 shows the database located in the home NSP. It should be noted that the location is exemplary only, and the database can exist in other networks, as long as it is available to the entity that makes access authorization decisions regarding the subscriber. The database 136 stores a plurality of records that associate a subscriber identity to a default quality of service profile defined for the subscriber. The default quality of service profiles of subscribers are configurable, so that default profiles of two different subscribers may be same or different. Generally the quality of service profile comprises one or more quality of service parameters to specify the collective effect of service performance. In this embodiment the quality of service profile of a subscriber comprises information through which an access network node may determine a set of transmission control parameters to be applied for packets to or from the subscriber, for example in form of rate limitation parameters.

Especially, consider that the primary purpose of WiMAX would be to merely provide best-effort broadband access to the Internet. In view of this, the default quality of service profile in the embodiment of FIG. 1 is set to comprise information that associates the subscriber by default to best effort service, i.e. high transmission rate service with minimal performance guarantees, which allows an unspecified variance in the measured performance criteria.

Due to the inherently limited nature of radio resource, the conventional bottleneck of systems providing wireless access has been the air interface. Along the progress of new radio access techniques and introduction of bandwidth allocation schemes, the obvious bottleneck is not necessarily in the air interface. An ubiquitous but at the same time simple control mechanism is necessary.

Figure 2:
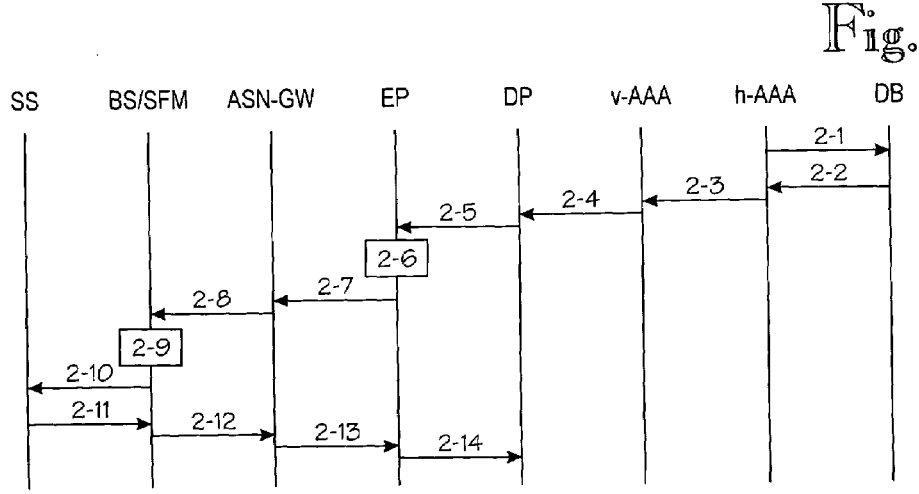
FIG. 2 illustrates a system-level signalling flow related to the embodiment of Figure.

FIG. 2 illustrates a system-level signalling flow related to the embodiment of FIG. 1 in an exemplary case where the subscriber is registering into a visited ASN. It should be noted that only steps essential for disclosing the invented functionality are shown in FIG. 2. For a person skilled in the art it is clear that other steps not specifically disclosed herein may be included in the actual signalling flow implementations without deviating from the scope of protection.

The procedure of FIG. 2 starts at a stage where the h-AAA server in the service provider's home network has received from the subscriber station a conventional access authorization request, made the specified checks and deemed that the subscriber station is allowed to access the WiMAX service. In such situation h-AAA sends to the database (step 2-1) a request that comprises identity of a subscriber and requests information on the default quality of service profile of the subscriber. In case such information is provisioned for the subscriber, the database forwards (step 2-2) the requested information to h-AAA. H-AAA generates a response message for authorizing the access, includes the received quality of service profile into the response message and sends the message towards the current ASN of the subscriber station. Since the current ASN is a visited ASN the access authorization message is first transmitted to v-AAA of the visited network (step 2-3) and from there to the current anchor ASN-GW (step 2-4).

ASN anchored mobility refers to a set of procedures associated with the movement of the subscriber station between base stations such that the anchor point for the subscriber station in the serving ASN does not change. Reference point R4 comprises a set of control and bearer plane protocols originating/terminating in functional entities of ASN that co-ordinate subscriber station mobility between ASNs and ASN.GWs. For a given ASN/NAP assigned to each subscriber station there exists a service flow authorization (SFA) logical entity that does not change for the duration of the subscriber station authentication session. A relay SFA that directly communicates with the base station is called the serving SFA The identity of the serving SFA, if different from the anchor, is known by the anchor SFA at all times. Similarly, the serving SFA knows the identity of the anchor SFA.

The associated procedures of anchored mobility involve transferring the context of service flows from the previous base station to the new base station. Since these are non-bearer plane functions, the access authorization message is delivered to the decision point (DP) of ASN-GW. In the pre-provisioned service flow example of FIG. 2, DP creates a RR-Request message intended to be delivered from the anchor SFA to the serving SFA (if different from anchor), and finally, from the serving SFA to the SFM in order to request reservation of resources for one or more identified unidirectional traffic flows from/to the subscriber station.

DP includes the received quality of service profile in it, and forwards the RR-Request message (step 2-5) to EP. EP sends the RR-Request message (step 2-7) conventionally to the serving SFA (i.e. the serving ASN-GW), which forwards the message to the base station (step 2-8) that acts as a service flow management (SFM) logical entity in the ASN and is thus responsible for the creation, admission, activation, modification and deletion of 802.16 service flows. The base station performs admission control (step 2-9) to decide whether a new service flow can be admitted based on existing radio and other local resource usage, and creates a service flow by exchanging a dynamic service addition (DSA) request and response messages with the subscriber station (steps 2-10 and 2-11). If the service slow is successfully created, the base station generates a RR-Response message that is delivered to the DP (step 2-12 to 2-14).

According to the current specification, the rate limitation for the uplink and downlink is performed in the base station, for example base station MAC scheduler, which is quite natural in view of conventional conception of the air interface being the most capacity-limited leg of the transmission path. It has been noted, however, that in several implementations the capacity across the R1 radio interface may not be the only bottleneck of the system. As a matter of fact, the R4 interface between the functional entities of ASN that co-ordinate MS mobility between ASNs and ASN-GWs and the R6 interface between the base station and ASN-GW are often last-hop microwave transport links that are likely to become congested with the considerably increased broadband traffic. According to the invention, in step 2-6 EP extracts the included quality of service profile of the subscriber from the RR-Request message, determines parameters for rate limitation and begins downlink rate limiting, advantageously implemented in addition to the downlink rate limitation of the base station. The parameters for rate limitation depend on the selected rate limitation scheme. In case of token bucket, the parameters comprise, for example, the mean rate, the burst size and/or the time interval of the token bucket. Other rate limitation mechanisms are applicable without deviating from the scope of protection.

It is possible to include the actual rate limitation parameters to the quality of service profile transferred in the system within access authorization response. Alternatively, rate limitation sets may be pre-provisioned into the base station and/or the EP, for example as a record comprising a group of predefined indexes and rate limitation sets corresponding to the indexes. The quality of service profile can then only refer to a predefined index and the controlling node (BS or ASN-GW) can retrieve the rate limitation set from the record. This optimally reduces the amount of information that has to be exchanged in order to accomplish the improved control.

The embodied rate limitation scheme provides a significantly simplified method to implement subscriber-based quality of service and at the same time effectively alleviate the possibility of congestion in transmission. The procedure provides a quicker and more robust method for implementing transmission flows for a subscriber selected default traffic type. In addition, the invented solution also serves as a basis for an optimized way to provide additional quality of service schemes appropriate for other traffic types.

Figure 3:
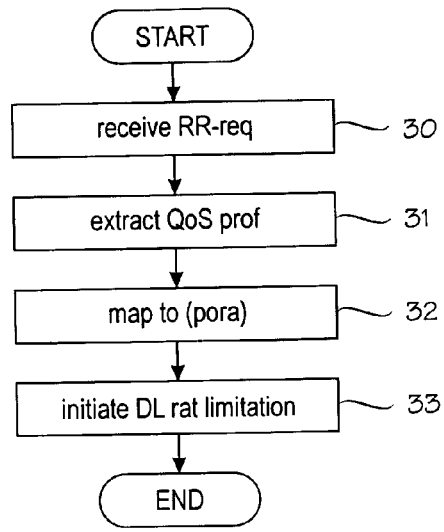
FIG. 3 illustrates the embodied solution from the point of view of the anchor ASN-GW.

FIG. 3 illustrates the embodied solution from the point of view of the anchor ASN-GW (EP) responsible of additional downlink transmission control in form of rate limiting. In the beginning, EP receives (step 30) from DP a RR-Request message that comprises the default quality of service profile initially received from the h-AAA. EP extracts the quality of service profile from the RR-request message (step 31) and maps it to a set of rate limitation parameters (step 32). After this, EP is ready to initiate rate limitation and thereby apply the derived rate limitation parameters in the bearer plane for downlink traffic targeted to the subscriber station.

It should be noted that the invention is not limited to pre-provisioned service flow creation, but is applicable also to dynamic service flow creation. In an alternative example, at any time after the subscriber station has registered into the visited ASN, it will dynamically initiate a service flow by forwarding a DSA request to the base station. As above, the quality of service profile has been delivered to the anchor ASN-GW during access authorization procedure and is thus available for downlink rate limitation. In such case it is possible to use the quality of service profile as a basis for the admission control in the ASN-GW.

Figure 4:
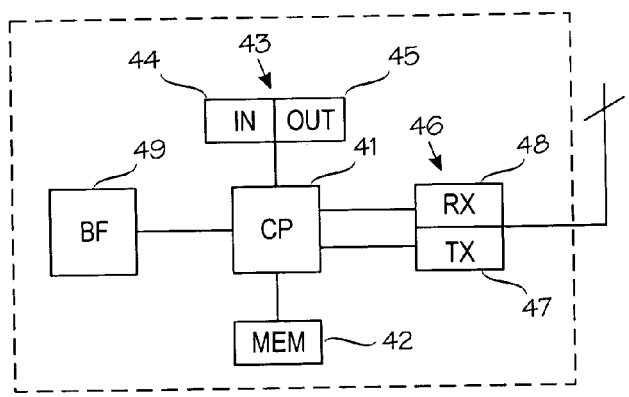
FIG. 4 comprises a functional description of communication device, i.e. a network node or a mobile station applicable for the present invention.

FIG. 4 comprises a functional description of communication device, i.e. a network node or a mobile station applicable for the present invention. All modifications and configurations required for implementing functionality of an embodiment may be performed as routines, which may be implemented as added or updated software routines, application circuits (ASIC) and/or programmable circuits. Software routines, also called program products, including applets and macros, can be stored in any device-readable data storage medium and they include program instructions to perform particular tasks. Software routines may also be downloaded into an apparatus.

The communication apparatus of FIG. 4 comprises at least one processing unit 41, an element that comprises an arithmetic logic unit, a number of special registers and control circuits. Connected to the processing unit is a memory unit 42, a data medium where computer-readable data or programs or user data can be stored. The memory means typically comprise memory units that allow both reading and writing (RAM), and a memory whose contents can only be read (ROM). The communication apparatus also comprises a user interface block 43 with user input unit 44 for inputting data by the user for internal processing in the unit, and user output unit 45 for outputting user data from the internal processes of the unit. Examples of apparatuses that may be included in said user input units comprise a keypad, or a touch screen, a microphone, or the like. Examples of apparatuses in said user output units comprise a screen, a touch screen, a loudspeaker, or the like. The communication apparatus also comprises a network access unit 46 that is connected to the processing unit 41, and configured with receiving unit 47 for receiving information from the network interface and processing it for inputting to the processing unit 41, as well as with transmitting unit 48 for receiving information from the processing unit 41, and processing it for sending via the network interface. The implementation of such a network access unit is generally known to a person skilled in the art. The profile access types cover various mobile and fixed access technologies, generally known to a person skilled in the art. The communication apparatus also comprises a basic functionality unit 49 that comprises the functionality specific for the network element role the communication apparatus implements. The processing means 41, memory means 42, user interface block 43, network access unit 46 and basic functionality unit 49 are electrically interconnected for performing systematic execution of operations on the received and/or stored data according to predefined, essentially programmed processes of the apparatus. In a solution according to the invention, the operations comprise the functionalities of communication apparatuses as will be disclosed with the embodiments herein.

For the cases where other that pre-provisioned quality of service profile is needed, current technologies provide sophisticated systems that designed for dynamic flow-based quality of service support and enable checking of the traffic against local policies in several domains. Their use in less complex environments results in unnecessarily high complexity and increased latency in signalling. In the communication system according to the invention these problems may be overcome by a simple mechanism where the subscriber-based default quality of service profile is applied as disclosed above, and the determination of the quality of service treatment is trusted to be made on the basis of communication decisions made in the originating ends (for example, subscriber stations or application servers). Easy-to-implement and fast mechanisms are used to eliminate misuse or abuse of the system.

Figure 5:
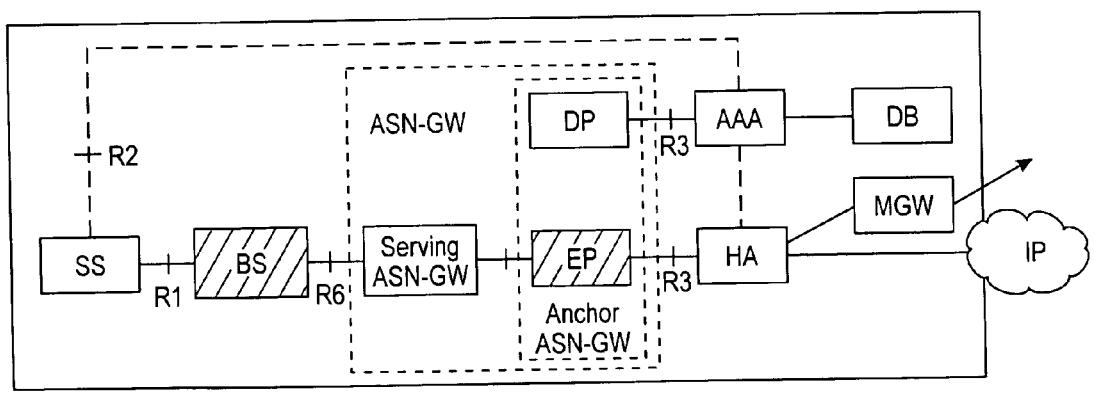
FIG. 5 illustrates the elements described in FIG. 1, elements relevant for the present embodiment being marked.

The embodiment is described again using the WiMAX technology without limiting the scope to this particular technology. FIG. 5 illustrates the elements described in FIG. 1. In FIG. 5, however, shows also the division of ASN-GW to serving ASN-GW and anchor ASN-GW, and the further division of anchor ASN-GW to bearer-related part EP and non-bearer related part DP as disclosed above. The embodiment is based on the capability of the ASN network element (for example, base station or EP) to detect in a received data packet a defined marking that points to set of rate limitation parameters for the base station MAC scheduler other than the applied set associated with the default profile. Due to a set of protective measures incorporated into the packet marking procedure, the ASN network element may trust the appropriateness of the marking and treat the packet according to the marking without a sequence of further policy checks.

Packet marking is typically performed by an ASN node that is capable of analyzing a defined character of a received packet, on the basis of the character to categorize the packet within a specific service group, and include a traffic descriptor that indicates the service group association within the packet. In the embodiment of FIG. 5, the uplink packet marking is performed in the ASN node that is responsible of downlink packet classification and therefore capable of recognizing the data packet to belong to a particular data flow. The defined character thus depends on a particular application. For example, a base station (marked with lineation) may detect that the uplink packet carries an established VoIP connection identifier and is thus able to determine that the uplink packet is VoIP traffic and to mark the packet as VoIP packet. On the other hand, ASN-GW (also marked with lineation) is able to associate an uplink packet with an existing VoIP generic routing encapsulation (GRE) tunnel flow, and mark the uplink packets accordingly.

As discussed above, the base station MAC scheduler maintains separate set of rate limitation parameters for the VoIP traffic. Since the VoIP is low-latency service, the VoIP packets need to have priority over the best effort packets. A potential way to abuse priority would be to delude the system to interpret all traffic from a particular subscriber as VoIP traffic and thus guarantee prioritized transmission for one's own communication. In the embodied system this is avoided by adjusting the rate limitation sets such that the mean rate for the VoIP traffic is considerably smaller than the mean rate of the default best effort traffic. Considerably smaller in this context means that the mean data rate associated with the token bucket for the best effort traffic should be 30 to 50 times the data rate associated with the token bucket of the VoIP traffic. Exemplary values for the mean data rates of the VoIP traffic and the best effort traffic could be 50 kb/s versus 2 MB/s, respectively. This way the user might be able to prioritize also his/her best effort traffic, but such prioritization would not be worth its while since the delivery times for any bandwidth demanding traffic would be disturbingly high. Additionally, due to the lesser bandwidth, the best effort transmissions would not be able to congest the ASN. The negative effect of abusive choices by the user may be complemented with charging schemes that accumulate charges quickly for non-appropriate transmission schemes. Examples of these comprise a flat-rate with a cap and progressive charging in steps, among others.

In the downlink packet marking is performed in the EP of Anchor-ASN-GW (marked with dots). In the embodiment downlink packets arriving from the same ASN network have been appropriately marked in the uplink as VoIP traffic and due to the inherent mechanism to eliminate abuse, the marking may be trusted as is. In addition, EP may be configured to recognize traffic coming from one or more trusted servers and trust the VoIP marking of such server as is. An example of such server is a multimedia gateway (MGM) controlled by the same network service provider. Any other traffic that comes from other networks, also called as external networks, cannot be trusted and is remarked as best effort traffic.

An example of applicable traffic type identificator is Differentiated Services (DiffServ) code point (DSCP). DiffServ is a model in which traffic is treated by intermediate systems with relative priorities based on the type of services field. DSCP typically is used by routers to provide the correct quality of service (QoS) according to the defined traffic class. Based on DSCP, traffic can be put into a particular service class, and packets within a service class may be treated the same way.

Figure 6:
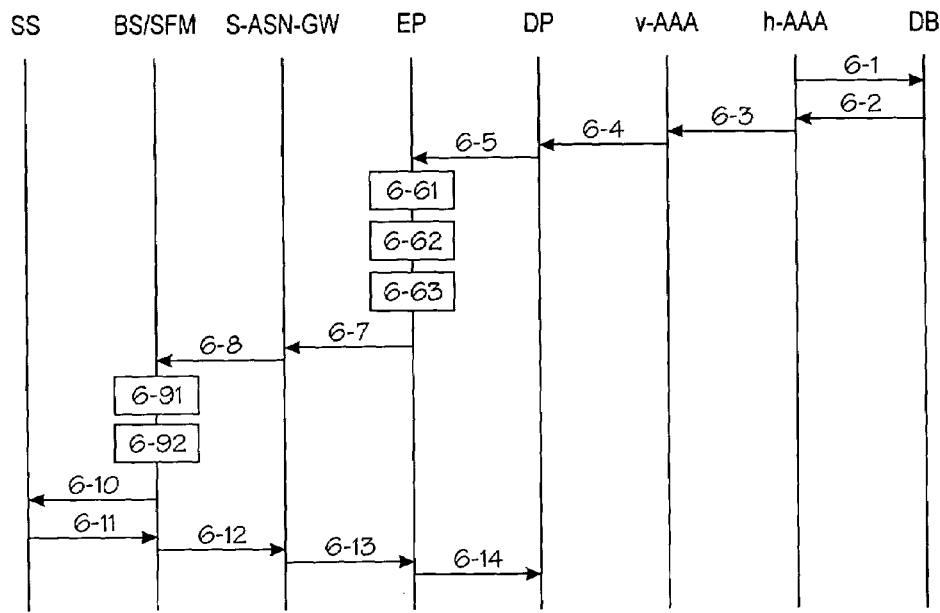
FIG. 6 illustrates a system-level signaling chart associated with the optimized service flow creation according to a further embodiment.

FIG. 6 illustrates a system-level signaling chart associated with the optimized service flow creation according to a further embodiment. It should be noted that FIG. 6 illustrates an exemplary signalling related to pre-provisioned service flow creation. As discussed with FIG. 2, the service flow creating party is not essential to the invention as such, and the scope covers at least the pre-provisioned service flow creation as well as the dynamic service flow creation, and possible other creation mechanisms that provide the subscriber station with access to connectivity service network through the access service network. In the embodiment VoIP traffic is enabled in addition to the pre-provisioned best effort traffic. Steps 6-2 to 6-5, 6-8, and 6-10 to 6-14 of FIG. 6 correspond directly with steps 2-2 to 2-5, 2-8, and 2-10 to 2-14 of FIG. 2 and their description will not be unnecessarily repeated here. When EP receives the quality of service profile, as in FIG. 2, it extracts the included quality of service profile of the subscriber from the RR-Request message, determines parameters for rate limitation and begins downlink rate limitation (step 6-61). In addition, EP begins marking (step 6-62) downlink data packets according to marking scheme described above. Furthermore, EP begins checking uplink packets, and whenever able to associate the uplink packet with a particular VoIP GRE tunnel, marking (step 6-63) the packet with VoIP DSCP.

As in FIG. 2, in receiving the RR-Request, the base station performs admission control (step 6-91) to decide whether a new service flow can be admitted based on existing radio and other local resource usage, and creates a service flow by exchanging a dynamic service addition (DSA) request and response messages with the subscriber station (steps 6-10 and 6-11). According to the invention, the base station also begins checking uplink packets, and whenever able to associate the uplink packet with a particular VoIP connection identifier, marking (step 6-92) the packet with VoIP DSCP.

The embodied quality of service scheme of FIG. 6 is significantly simpler and therefore quicker that the 3GPP based quality of service architecture of WiMAX but is, however, able to provide adequately differentiate transmission of the two traffic types (best effort and VoIP traffic) essential for WiMAX. The solution provides simple and therefore easily applicable support for quality of service in 3GPP/3GPP2 (3rd Generation Partnership Project/3rd Generation Partnership Project 2) IP multimedia subsystem and for other peer-to-peer communication types, like Skype, GoogleTalk etc.

Figure 7:
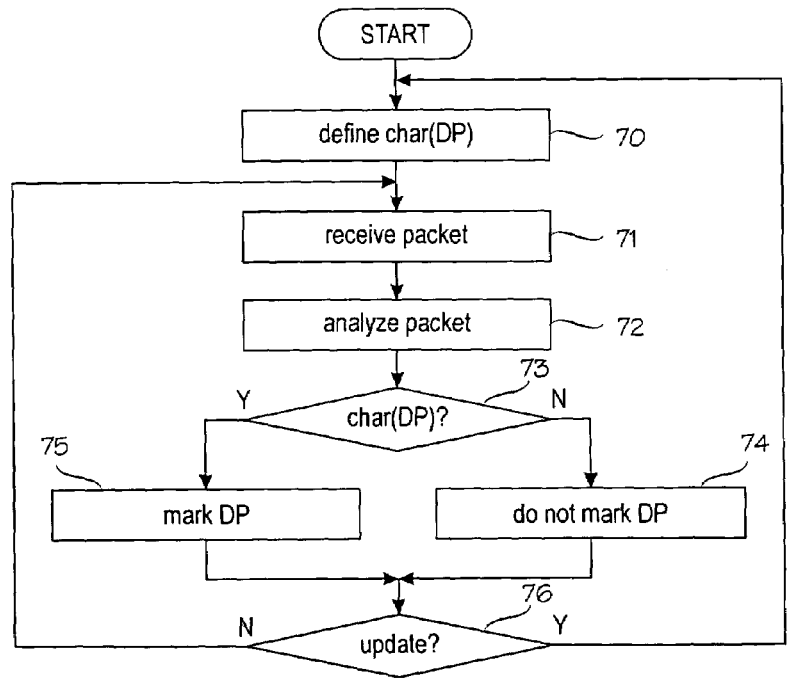
FIG. 7 illustrates the embodied solution from the point of view of the network node responsible of packet marking.

FIG. 7 illustrates the embodied solution from the point of view of the network node responsible of packet marking. In terms of the embodiment of FIG. 6, the network node may be the base station or the anchor ASN-GW for the uplink packet marking, or the anchor ASN-GW for the downlink packet marking. In the beginning, the network node is configured with a criterion (step 60) that enables the network node to detect a VoIP packet for marking. In case of base station uplink traffic, the criterion comprises recording the current connection identifiers of current VoIP flows. In case of ASN-GW uplink traffic, the criterion comprises recording the current VoIP GRE tunnel identifications. In case of ASN-GW downlink traffic, the criterion of the present embodiment comprises recording the trusted and non-trusted data packet sources.

When the network node receives (step 71) a data packet, it analyzes (step 72) the content of the packet, checks (step 73) whether a characteristic fulfilling the criterion exists in the data packet. In case the criterion is not met, the network node does not mark the packet (step 74) and the uplink rate limitation will occur normally in the base station according to the rate limitation set of the default quality of service profile. In case the criterion is met, the network node marks the packet with VoIP DSCP (step 75). When the need for marking is checked, the network node will check whether the definition of the characteristic needs to be updated (step 76). In case of dynamic definitions, for example the ones based on existing VoIP flows, the update is necessary on a continuous basis, and the procedures moves back to step 70. In case of more static definitions, for example the ones based on identifying the sources data packets, update is not necessarily needed and the procedure may move directly back to step 61 of receiving a new data packet.

It should be noted that the exemplary characteristics and criteria used in describing the solution of FIG. 7 may be modified in various ways without deviating from the scope of protection. In addition to the best effort and VoIP traffic, the traffic may comprise other types, like real time traffic. The analysis of received data packets may be based on alternative criteria, configured according to the application environment. For example, a network node may be configured to determine the size of the incoming data packet and mark data packets that do not exceed a defined threshold size as real-time traffic. This enables rapid delivery of small data packets, and especially provides low measured packet Internet groper (PING) values to represent response times in the network.

In an aspect, the invention provides a computer program product encoding a computer program of instructions for executing a computer process.

In another aspect, the invention provides a computer program distribution medium readable by a computer and encoding a computer program of instructions for executing a computer process.

The distribution medium may include a computer readable medium, a program storage medium, a record medium, a computer readable memory, a computer readable software distribution package, a computer readable signal, a computer readable telecommunications signal, and/or a computer readable compressed software package.

Embodiments of the computer process are shown and described in conjunction the attached signaling and flow charts. The computer program may be executed in the processing unit of the respective apparatus.

It will be obvious to a person skilled in the art that, as the technology advances, the inventive concept can be implemented in various ways. The invention and its embodiments are not limited to the examples described above but may vary within the scope of the claims.

The invention claimed is:

1. A method, comprising:
   receiving in an anchor gateway in an access service network a quality of service profile for a subscriber;
   determining, in the anchor gateway on the basis of the quality of service profile, a first set of transmission control parameters for the subscriber;
   applying in the anchor gateway the first set of transmission control parameters to user data packets transmitted between the anchor gateway and a base station to the subscriber;
   adjusting the available transmission parameter sets such that a transmission parameter set providing queuing priority enables considerably smaller transmission rate;
   applying transmission control parameter sets by means of a token bucket; and
   adjusting the token bucket mean data rate associated with a transmission parameter set providing the lowest queuing priority to be 30 to 50 times the mean data rate associated with the highest queuing priority.

2. A method according to claim 1, further comprising receiving the quality of service profile during an access authorization procedure of the subscriber.

3. A method according to claim 1, further comprising
   checking in the anchor gateway user data packet addressed to the subscriber for at least one predetermined classification characteristic of the user data packet; and
   marking in the anchor gateway the user data packet on the basis of the existence of the at least one characteristic, each marking corresponding to a set of transmission control parameters.

4. A method according to claim 3, further comprising using an origin of the packet as the predetermined classification characteristic of the user data packet.

5. A method according to claim 4, further comprising trusting markings in user data packets originating from subscribers under the same anchor gateway.

6. A method according to claim 4, further comprising maintaining for the anchor gateway a list of trusted network nodes; and
   trusting markings in user data packets originating from any of the trusted network nodes.

7. A method according to claim 4, further comprising re-marking user data packets originating from external networks to correspond with the first set of transmission control parameters corresponding to the quality of service profile of the subscriber.

8. An apparatus comprising:
   at least one processor; and
   at least one memory including computer program code,
   the at least one memory and the computer program code configured, with the at least one processor, to cause the apparatus at least to:
   implement functionality of an anchor gateway in an access service network;
   receive user data packets addressed to subscribers anchored to the access service network, and receive a quality of service profile for a subscriber;
   determine, on the basis of the received quality of service profile, a first set of transmission control parameters for the subscriber;
   apply the first set of transmission control parameters to user data packets transmitted between the anchor gateway and a base station to the subscriber;
   adjust the available transmission parameter sets such that a transmission parameter set providing queuing priority enables considerably smaller transmission rate;
   apply transmission control parameter sets by means of a token bucket; and
   adjust the token bucket mean data rate associated with a transmission parameter set providing the lowest queuing priority to be 30 to 50 times the mean data rate associated with the highest queuing priority.

9. An apparatus according to claim 8, wherein the at least one memory and the computer program code are configured, with the at least one processor, to cause the apparatus to receive the quality of service profile during an access authorization procedure of the subscriber.

10. An apparatus according to claim 8, wherein
   the at least one memory and the computer program code are configured, with the at least one processor, to cause the apparatus to
   check user data packet addressed to the subscriber for at least one predetermined classification characteristic of the user data packet; and
   mark the user data packet on the basis of the existence of the at least one characteristic, each marking corresponding to a set of transmission control parameters.

11. An apparatus according to claim 10, wherein the at least one memory and the computer program code are configured, with the at least one processor, to cause the apparatus to use an origin of the packet as the predetermined classification characteristic of the user data packet.

12. An apparatus according to claim 10, wherein the at least one memory and the computer program code are configured, with the at least one processor, to cause the apparatus to trust markings in user data packets originating from subscribers anchored by the apparatus.

13. An apparatus according to claim 10, wherein the at least one memory and the computer program code are configured, with the at least one processor, to cause the apparatus to
maintain for the anchor gateway a list of trusted network nodes;
trust markings in user data packets originating from any of the trusted network nodes.

14. An apparatus according to claim 10, wherein the at least one memory and the computer program code are configured, with the at least one processor, to cause the apparatus to re-mark user data packets originating from external networks to correspond with the first set of transmission control parameters corresponding to the quality of service profile of the subscriber.

15. An apparatus according to claim 10, wherein
the at least one memory and the computer program code are configured, with the at least one processor, to cause the apparatus to
check user data packet from the subscriber for at least one predetermined classification characteristic of the user data packet; and
mark the user data packet on the basis of the existence of the at least one characteristic, each marking corresponding to a set of transmission control parameters.

16. An apparatus according to claim 15, wherein the predetermined classification characteristic comprises identification of a tunnel for a service flow, the tunnel being associated with a defined set of transmission control parameters.

17. An apparatus comprising:
at least one processor; and
at least one memory including computer program code, the at least one memory and the computer program code configured, with the at least one processor, to cause the apparatus at least to implement functionality of a base station of an access service network;
receive user data packets from a subscriber station; check a user data packet from the subscriber station for at least one predetermined classification characteristic of the user data packet, and mark the user data packet on the basis of the existence of the at least one characteristic, each marking corresponding to a set of transmission control parameters;
apply the first set of transmission control parameters to user data packets transmitted between an anchor gateway and the base station to the subscriber;
adjust the available transmission parameter sets such that a transmission parameter set providing queuing priority enables considerably smaller transmission rate;
apply transmission control parameter sets by means of a token bucket; and
adjust the token bucket mean data rate associated with a transmission parameter set providing the lowest queuing priority to be 30 to 50 times the mean data rate associated with the highest queuing priority.

18. An apparatus according to claim 17, wherein the predetermined classification characteristic comprises identification of a connection for a service flow, the connection being associated with a defined set of transmission control parameters.

19. A system comprising:
a subscriber station and a network, the network comprising an access service network and connectivity service network, the access service network including an apparatus comprising
a basic functionality unit configured to implement functionality of an anchor gateway in an access service network;
a receiver unit configured to receive user data packets addressed to subscribers anchored to the access service network, wherein the receiver unit is configured to receive a quality of service profile for a subscriber; and
a processing unit configured to
determine, on the basis of the received quality of service profile, a first set of transmission control parameters for the subscriber and apply the first set of transmission control parameters to user data packets transmitted between the anchor gateway and a base station to the subscribers;
adjust the available transmission parameter sets such that a transmission parameter set providing queuing priority enables considerably smaller transmission rate;
apply transmission control parameter sets by means of a token bucket; and
adjust the token bucket mean data rate associated with a transmission parameter set providing the lowest queuing priority to be 30 to 50 times the mean data rate associated with the highest queuing priority.

20. A computer program, embodied on a non-transitory computer readable medium, the computer program configured to control a processor to perform operations comprising:
receiving in an anchor gateway in an access service network a quality of service profile for a subscriber;
determining, in the anchor gateway on the basis of the quality of service profile, a first set of transmission control parameters for the subscriber;
applying in the anchor gateway the first set of transmission control parameters to user data packets transmitted between the anchor gateway and a base station to the subscriber;
adjusting the available transmission parameter sets such that a transmission parameter set providing queuing priority enables considerably smaller transmission rate;
applying transmission control parameter sets by means of a token bucket; and
adjusting the token bucket mean data rate associated with a transmission parameter set providing the lowest queuing priority to be 30 to 50 times the mean data rate associated with the high

* * * * *

UNITED STATES PATENT AND TRADEMARK OFFICE
CERTIFICATE OF CORRECTION

PATENT NO. : 8,660,555 B2  
APPLICATION NO. : 11/592259  
DATED : February 25, 2014  
INVENTOR(S) : Pichna et al.

Page 1 of 1

It is certified that error appears in the above-identified patent and that said Letters Patent is hereby corrected as shown below:

In the Specification:

| | |
|---|---|
| Column 1, Line 22 | Replace "wide rage of mechanisms" With -- wide range of mechanisms -- |
| Column 6, Line 21 | Replace "serving SFA The identity" With -- serving SFA. The identity -- |

In the Claims:

| | |
|---|---|
| Column 14, Claim 19, Line 21 | Replace "configured to" With -- configured to: -- |
| Column 14, Claim 19, Line 27 | Replace "the subscribers;" With -- the subscriber; -- |
| Column 14, Claim 20, Line 58 | Replace "with the high" With -- with the highest queuing priority. -- |

Signed and Sealed this  
Third Day of June, 2014

Michelle K. Lee  
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,660,555 B2 | Page 1 of 1 |
| APPLICATION NO. | : 11/592259 | |
| DATED | : February 25, 2014 | |
| INVENTOR(S) | : Pichna et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 571 days.

Signed and Sealed this
Twenty-fifth Day of August, 2015

Michelle K. Lee
*Director of the United States Patent and Trademark Office*